Figure 1:
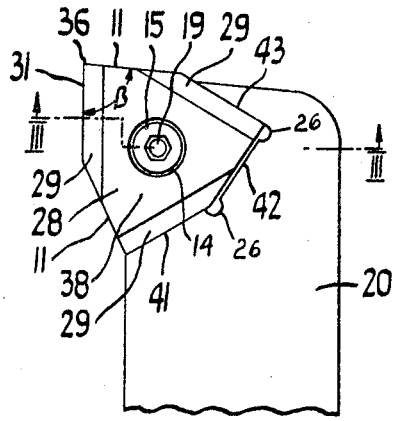

Sept. 13, 1966   R. BREUNING   3,271,842
EXCHANGEABLE TOOL BIT
Filed May 25, 1964   2 Sheets-Sheet 1

INVENTOR.
Robert Breuning
BY
Michael J. Striker

United States Patent Office 3,271,842
Patented Sept. 13, 1966

3,271,842
EXCHANGEABLE TOOL BIT
Robert Breuning, Hauptstrasse 58,
Besigheim (Neckar), Germany
Filed May 25, 1964, Ser. No. 369,913
Claims priority, application Germany, July 16, 1960,
B 58,624; Aug. 20, 1960, K 41,512
10 Claims. (Cl. 29—96)

This is a continuation-in-part of my copending application Serial No. 74,863, filed December 9, 1960, now Patent No. 3,137,918 for "Lathe Tool Holder With Interchangeable Flat Polygonal Bits Fixed by a Screw.

The invention relates to interchangeable flat polygonal bits fixed in a lathe tool holder by means of a screw. It is an object of the invention to provide for an interchangeable bit permitting, on the one hand, 100% utilization of the bit, and on the other hand, having, in combination with a suitable tool holder, all the advantages of normal lathe tools (turning tools), in which the bit is permanently connected to the holder shank by brazing or the like. These known tools with fixed bits have inter alia the advantage that a positive top rake is provided, and in addition the surface of the bit is entirely free.

It is another object of this invention to provide for an exchangeable tool bit which has a maximum number of cutting edges which may be used for a variety of cutting operations. It is still another object of this invention to provide for a tool bit as set forth which is adapted to be used both as left hand and as right hand tool.

It is a further object of this invention to provide for a tool bit as above stated which is equipped with chip-guiding steps for establishing a positive cutting angle, yet having a supporting surface underneath which extends up to the cutting edge.

It is another object of this invention to provide for tool bits as set forth which are formed with stable points defined by comparatively large corner angles of the order of almost 90°.

With above objects in view the invention includes an exchangeable tool bit adapted to be attached to a tool holder, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said plate of hexagonal contour having three substantially equal corner angles of a magnitude between 82° and 88° and defined each by a pair of two adjacent ones of said side faces, and means for attaching said plate to a tool holder.

Figure 2:
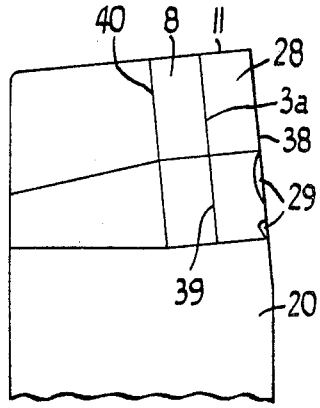
Figure 3:
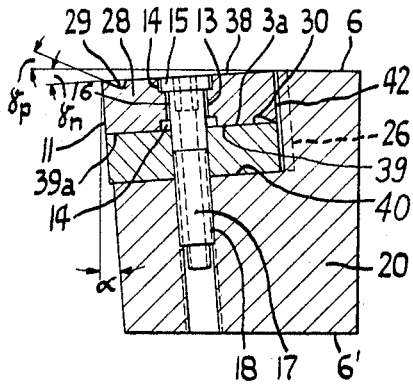
Figure 4:
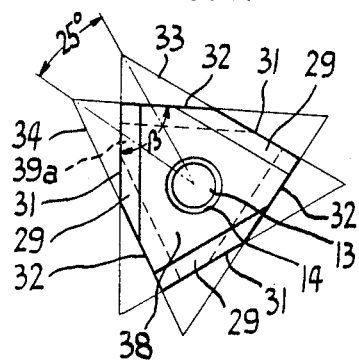
Figure 5:
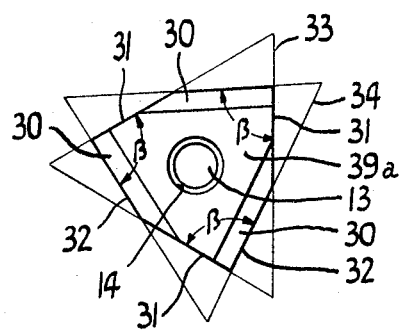
Figure 6:
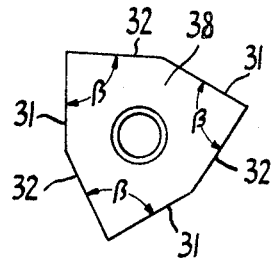
Figure 7:
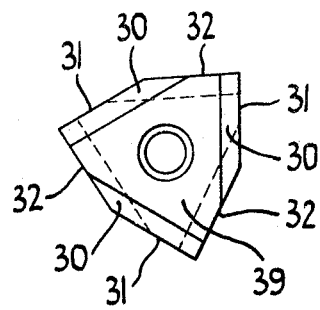

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows a plan of a lathe tool holder with interchangeable hexagonal flat bit;

FIG. 2, a side view of an arrangement according to FIG. 1;

FIG. 3, a cross section on the line III—III in FIG. 1;

FIG. 4, a plan of a hexagonal bit as side-working tool;

FIG. 5, a view of this bit from below;

FIG. 6, a plan of a bit similar to FIGS. 4 and 5, but without chip-guiding steps, positioned as right-hand tool;

FIG. 7, a plan of a bit similar to FIG. 5 but reversed as left-hand tool; and

Figure 8:
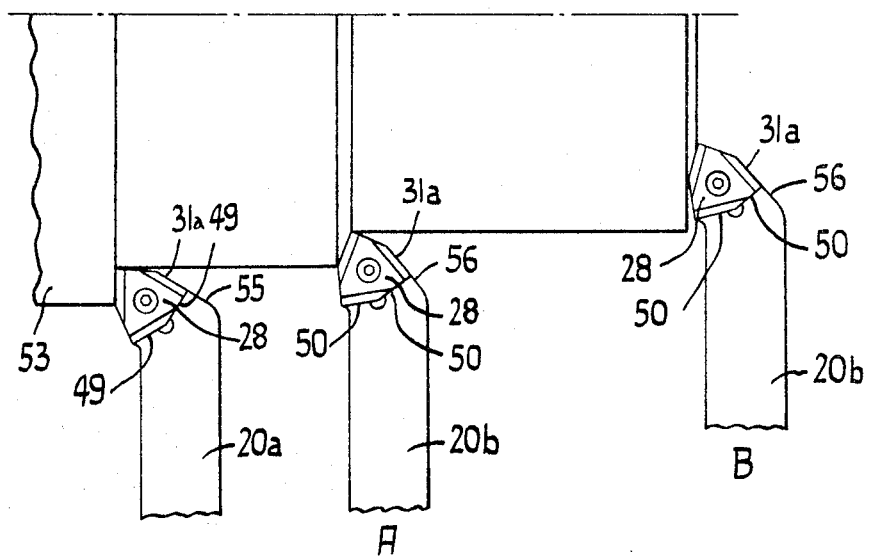

FIG. 8, a plan of a lathe tool holder with hexagonal bit in recessing, rough turning and facing.

Referring to FIGS. 1 to 3, 20 is a tool holder and 28 is a flat hexagonal bit of tungsten carbide, ceramic material or the like. The tool holder has a recess with seating surface 40 and two lateral supporting surfaces 41 and 43 and a third lateral surface 42 which are at right angles to the seating surface 40. As will be seen from the drawing, the seating surface 40 is inclined downwardly in the direction of the operative cutting edge 31 relatively to the upper side 6 of the tool holder, which is parallel to the lower side 6'. In FIG. 6, this angle of inclination is denoted by $\gamma_n$. Between bit 28 and seating surface 40, there is provided advantageously an intermediate plate 8 of a material which is harder than the tool holder 20. In this case, the bit rests on a seating surface 3a on the intermediate plate 8. Due to the interposition of the intermediate plate, which for example is made of hardened high-speed steel, this intermediate plate absorbs so much heat that the tool holder is not deformed by the action of heat and cutting pressure.

As will be seen from the drawing, the bit 28 has side faces 11 at right angles to the upper side 38 and lower side 39, and furthermore chip-guiding steps 29 are provided on the upper side 38 and lower side 39 of all the cutting edges. The bit 28 shown by way of example accordingly has altogether six cutting edges.

As shown in the drawing, the flat bit and the intermediate plate 8 are completely embedded in the tool holder, that is to say, the side faces 11 are flush with the side faces of the tool holder, a clearance angle $\alpha$ being provided, as shown in FIG. 3. In view of the inclined position of the seating surface 40, a negative rake $\gamma_n$ is primarily obtained. Due to the provision of the chip-guiding steps 29, however, there is actually a positive top rake $\gamma_D$ at the operative cutting edge 31.

A fixing screw, advantageously in the form of a cylindrical head screw, is used for fixing the bit 38. For this purpose, a central bore 13 with shallow cylindrical countersunk recesses 14 is provided in the bit. As will be seen, the flat cylindrical head 15 of the screw fits into one countersunk recess 14, so that the head is countersunk in the bit, and therefore this fixing element does not project and a completely free bit surface is obtained.

FIG. 3 also shows that there is so much clearance between screw shank 16 and bore 13, and between cylinder head 15 and the upper countersinking recess 14 that under the effect of the horizontal component of the cutting pressure, the bit is supported only by the lateral faces 41 and 43 of the holder. The fixing screw thus takes up tensile forces only but no bending forces, so that a screw of comparatively small diameter may be used. The advantage of this is that the bore 13 also has comparatively small diameter, that is to say, the flat bit is scarcely weakened by the bore. Due to this small bore, it is also possible to use a comparatively small bit.

Furthermore, according to the invention, the threaded shaft 17 of the screw is made so long that when the bit is rotated for changing the cutting edges, the screw need not be screwed completely out of the screw-threaded bore 18 of the holder. For changing the cutting edges, therefore, the cylindrical head screw, which has a hexagonal recess 19 for the spanner, is unscrewed somewhat, the bit 28 is then lifted, rotated a certain amount and the re-inserted into the recess defined by the lateral faces 41–43, whereupon the screw 17 is retightened.

To obviate the disadvantages of square and triangular bits used as side-working tools, the hexagonal bit 28 is provided according to FIGS. 1 to 8, this bit being formed with or without the chip-guiding steps 29 and 30 on the upper and lower sides, respectively, along the individual cutting edge. In the particularly advantageous construction shown, the edges 31 and 32 of the bit are formed by the side sections of two congruent equilateral triangles 33 and 34, which have been turned through about 25° on their common centre of gravity.

By this construction according to FIGS. 1, 4 and 5, a point angle β of 85° is obtained, that is to say, a much larger angle than is possible in the case of a bit of triangular shape. In view of this larger point angle β, the risk of fracture of the operative point 36 of the bit is considerably reduced. The new hexagonal form of bit has also the advantage of being weakened much less by the central bore 13 than is a triangular bit. In addition, the external dimensions of this hexagonal bit may be made much smaller than in the case of a triangular bit, resulting in a considerable saving in material. In addition thereto, in the hexagonal shape of bit according to FIGS. 1 to 8, a comparatively large seating surface 38 and 39 is obtained.

Seating of the bit can also be improved advantageously by offset arrangement of the cutting edges and chip-guiding steps on the upper side of the bit relatively to the lower side. This is favored due to the fact that the edges 31 and 32 have all the same length. Accordingly, on the upper side 38, the cutting edges 31 and chip-guiding steps 29 are provided on the side sections of the one triangle 33, and on the lower side, the cutting edges 32 and chip-guiding steps 30 are provided on the side sections of the other triangle 34, as can be seen from FIG. 4.

Therefore, under the operative cutting edge 31 at left in FIG. 4, there is not another cutting edge and chip-guiding step on the lower side of the bit, but on the contrary the part 39a of the lower surface 39 (see also FIG. 3). Thus, very good seating and support is provided for this hexagonal bit.

FIGS. 1 and 3 furthermore show that the recess provided in the tool holder for the hexagonal bit 28 has, in addition to the inclined seating surface 40, the three lateral surfaces 41, 42 and 43 so arranged that the bit is supported only on the two externally situated lateral surfaces 41 and 43. At the same time, the corners formed by the lateral surfaces 41 to 43 are advantageously drilled out, as indicated at 26.

As shown further by the drawings, in the hexagonal bit 28, the chip-guiding steps 29 and 30 are continuous. In this way, not only is the complete side edge length utilized as cutting edge, but in addition, grinding of the chip-guiding steps is facilitated.

Another substantial advantage of the hexagonal bit according to FIGS. 1 to 8 is that when the cutting edges become worn, all the continuous chip-guiding steps can be reground without diminishing the seating surface of the bit on the tool holder. Despite repeated regrinding, therefore, the cutting action remains completely unimpaired.

It can be seen from the above that the tool bit according to the invention entails considerable advantages over the prior art. This tool bit FIG. 6 has three cutting edges along one face and three cutting edges along the other face. Any one of the three edges along the one face may be used for left-hand work while any one of the three edges along the other face may be used for right-hand work, one edge after the other in rotation until they all require sharpening. But since the bit according to the invention is a plate of hexagonal shape of which all sides 31, 32 have equal length although the angles β at the cutting corners are of the order of 85° and the remaining corner angles are of the order of 155° the resulting advantage is the possibility of using the bit both in normal and in upside-down position and of thus doing right-hand cutting and left-hand cutting under identical conditions with edges of identical length and with one single tool bit.

FIG. 8 furthermore shows that the hereinbefore described hexagonal bit 28 can be used for different machining operations on a work-piece 53. Thus, the hexagonal bit 28 fixed to a tool holder 20a (side-working tool) can be used for recessing.

FIG. 8 also shows at A that a tool holder 20b with the hexagonal bit 28 can be used for rough turning and that as shown at B, the same tool holder 20b is also suitable for facing. As follows from FIG. 8, A and B, the recess for the bit 28 and the supporting surfaces 50 on the tool holder are so arranged that the tool holder can be used for both roughing and facing.

FIG. 8 shows that the front end of tool holders 20a and 20b is bent towards the cutting edge and at the same time is tapered so that its outline corresponds approximately to the outline of the bit 28, or the back 55 or 56 of the tool holder does not project beyond the corresponding edge 31a of the bit. This construction has inter alia the advantage that work-pieces of small diameter can be machined, since the front end of the tool holder, due to the provision of the inclined back 56, is not affected by the lathe centre which holds the work-piece.

FIG. 8 shows furthermore that only two supporting surfaces 49 and 50, respectively, are provided on the tool holder, these surfaces corresponding in size and arrangement to two adjacent side faces 31, 32 of the bit.

It will be understod that each of the elements described above, or two or more together, may also find a useful application in other types of tool bits differing from the types described above.

While the invention has been illustrated and described as embodied in a tool bit attachable to a lathe tool holder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An exchangeable tool bit adapted to be attached to a tool holder, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said plate of hexagonal contour having three substantially equal corner angles of a magnitude between 82° and 88° and defined each by a pair of two adjacent ones of said side faces, and means for attaching said plate to a tool holder.

2. An exchangeable tool bit adapted to be attached to a tool holder by means of an attaching screw, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said plate of hexagonal contour having three substantially equal corner angles of a magnitude between 82° and 88° and defined each by a pair of two adjacent ones of said side faces, and means for attaching said plate to a tool holder and including a central perforation formed for accommodating an attaching screw and provided with countersunk recesses at said upper and lower faces for receiving the head of said screw.

3. An exchangeable tool bit adapted to be attached to a tool holder, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said plate of hexagonal contour having three substantially equal corner angles of a magnitude between 82° and 88° and defined each by a pair of two adjacent ones of said side faces, the shape of said hexagonal contour being defined as the common area of two superimposed congruent equilateral triangles turned one relative to the other substantially 25° about their common center of gravity, and means for attaching said plate to a tool holder.

4. An exchangeable tool bit adapted to be attached to a tool holder by means of an attaching screw, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said plate of hexagonal contour having three substantially equal corner angles of a magnitude between 82° and 88° and defined each by a pair of two adjacent ones of said side faces, the shape of said hexagonal contour being defined as the common area of two superimposed congruent equilateral triangles turned one relative to the other substantially 25° about their common center of gravity, and means for attaching said plate to a tool holder and including a central perforation formed for accommodating an attaching screw and provided with countersunk recesses at said upper and lower faces for receiving the head of said screw.

5. An exchangeable tool bit adapted to be attached to a tool holder, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said cutting edges being formed with a chip guide groove extending substantially parallel thereto and between the edges located along the particular face between the particular cutting edge and the other cutting edges, said cutting edges along said upper face being angularly offset in circumferential direction against said cutting edges along said lower face, respectively, said plate of hexagonal contour having three substantially equal corner angles of a magnitude between 82° and 88° and defined each by a pair of two adjacent ones of said side faces, and means for attaching said plate to a tool holder.

6. An exchangeable tool bit adapted to be attached to a tool holder by means of an attaching screw, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as cutting edge, said cutting edges being formed each with a chip guide groove extending substantially parallel thereto and between the edges located along the particular face between the particular cutting edge and the other cutting edges, said cutting edges along said upper face being angularly offset in circumferential direction against said cutting edges along said lower face, respectively, said plate of hexagonal contour having three substantially equal corner angles of a magnitude between 82° and 88° and defined each by a pair of two adjacent ones of said side faces, and means for attaching said plate to a tool holder and including a central perforation formed for accommodating an attaching screw and provided with countersunk recesses at said upper and lower faces for receiving the head of said screw.

7. An exchangeable tool bit adapted to be attached to a tool holder, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said cutting edges being formed each with a chip guide groove extending substantially parallel thereto and between the edges located along the particular face between the particular cutting edge and the other cutting edges, said cutting edges along said upper face being angularly offset in circumferential direction against said cutting edges along said lower face, respectively, said plate of hexagonal contour having three substantially equal corner angles of a magnitude between 82° and 88° and defined each by a pair of two adjacent ones of said side faces, the shape of said hexagonal contour being defined as the common area of two superimposed congruent equilateral triangles turned one relative to the other substantially 25° about their common center of gravity, and means for attaching said plate to a tool holder.

8. An exchangeable tool bit adapted to be attached to a tool holder by means of an attaching screw, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along upper and lower edges, respectively, every second one of said upper edges and every second one of said lower edges being formed as a cutting edge, said cutting edges being formed each with a chip guide groove extending substantially parallel thereto and between the edges located along the particular face between the particular cutting edge and the other cutting edges, said cutting edges along said upper face being angularly offset in circumferential direction against said cutting edges along said lower face, respectively, said plate of hexagonal contour having three substantially equal corner angles of a magnitude between 82° and 88° and defined each by a pair of two adjacent ones of said side faces, the shape of said hexagonal contour being defined as the common area of two superimposed congruent equilateral triangles turned one relative to the other substantially 25° about their common center of gravity, and means for attaching said plate to a tool holder and including a central perforation formed for accommodating an attaching screw and provided with countersunk recesses at said upper and lower faces for receiving the head of said screw.

9. An exchangeable tool bit adapted to be attached to a tool holder, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along six upper edges of substantially equal length and six corresponding lower edges of equal length respectively, every second one of said upper edges of equal length and every alternate second one of said lower edges of equal length adapted to be formed as a cutting edge, and said side faces and their upper and lower edges respectively forming alternating three smaller corner angles of substantially equal size and three larger corner angles of substantially equal size, each of said smaller corner angles of equal size being slightly smaller than 90° and each of said larger corner angles of equal size being substantially larger than 90°; and means for attaching said plate to a tool holder.

10. An exchangeable tool bit adapted to be attached to a tool holder, comprising, in combination, a plate of hexagonal contour having an upper face and a lower face substantially parallel to each other and six side faces of substantially equal length and extending between said upper and lower faces substantially perpendicular thereto, said side faces intersecting said upper and lower faces along six upper edges of substantially equal length and six corresponding lower edges of equal length respectively, every second one of said upper edges of equal length and every alternate second one of said lower edges of equal length adapted to be formed as a cutting edge, and said side faces and their upper and lower edges respectively forming alternating three smaller corner angles of substantially equal size and three larger corner angles of substantially equal size, each of said smaller corner angles of equal size being slightly smaller than 90° and each of said larger corner angles of equal size being substantially larger than 90°, and means for attaching said plate to a tool holder and including a central perforation formed for accommodating an attaching screw and provided with countersunk recesses at said upper and lower faces for receiving the head of said screw.

No references cited.

WILLIAM W. DYER, JR., *Primary Examiner.*

H. H. HINSON, *Assistant Examiner.*